US009688115B2

(12) United States Patent
Klappert et al.

(10) Patent No.: US 9,688,115 B2
(45) Date of Patent: *Jun. 27, 2017

(54) METHODS AND SYSTEMS FOR PRODUCING THE ENVIRONMENTAL CONDITIONS OF A MEDIA ASSET IN A VEHICLE

(71) Applicant: Rovi Guides, Inc., San Carlos, CA (US)

(72) Inventors: Walter R. Klappert, Los Angeles, CA (US); Michael R. Nichols, La Canada Flintridge, CA (US); Satinderpal S. Sikh, Studio City, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,079

(22) Filed: Aug. 6, 2014

(65) Prior Publication Data

US 2014/0350798 A1    Nov. 27, 2014

Related U.S. Application Data

(63) Continuation of application No. 13/601,222, filed on Aug. 31, 2012, now Pat. No. 8,831,840.

(51) Int. Cl.
| | |
|---|---|
| *A63G 31/16* | (2006.01) |
| *A63J 5/02* | (2006.01) |
| *B60H 1/00* | (2006.01) |
| *H04N 21/414* | (2011.01) |
| *H04N 21/41* | (2011.01) |

(52) U.S. Cl.
CPC ......... *B60H 1/00735* (2013.01); *A63G 31/16* (2013.01); *H04N 21/4131* (2013.01); *H04N 21/41422* (2013.01)

(58) Field of Classification Search
CPC .. A63G 31/16; A63G 31/00; A63J 5/02; A63J 5/04; B60H 1/00735; H04N 21/4131; H04N 21/41422
See application file for complete search history.

(56) References Cited

U.S. PATENT DOCUMENTS

| | | | |
|---|---|---|---|
| 5,724,775 | A | 3/1998 | Zobel, Jr. et al. |
| 5,865,624 | A | 2/1999 | Hayashigawa |
| 6,733,293 | B2 | 5/2004 | Baker et al. |
| 7,402,041 | B2 | 7/2008 | Nelms et al. |
| 8,046,408 | B2 | 10/2011 | Torabi |
| 2007/0049384 | A1 | 3/2007 | King et al. |
| 2010/0261526 | A1 | 10/2010 | Anderson et al. |
| 2011/0063208 | A1 | 3/2011 | Van Den Eerenbeemd et al. |

OTHER PUBLICATIONS

XNA 4.0 City Environment Car Driving Simulation, You Tube, pp. 1-2 (downloaded May 24, 2012).
Jones, "Motion Simulation Debuts Most Immersive Video Game System Ever," (downloaded May 24, 2012).

*Primary Examiner* — Mary Cheung
(74) *Attorney, Agent, or Firm* — Ropes & Gray LLP

(57) ABSTRACT

Methods and systems are disclosed for a guidance application capable of coordinating the interior features of a vehicle (e.g., the heating/cooling system, automatic windows, automatic seats, automatic sunroof, seat heaters, etc.) to produce the current environmental conditions (e.g., sunshine, heat, wind, etc.) displayed in a media asset being accessed in the vehicle.

20 Claims, 8 Drawing Sheets

500

MEDIA ASSET DATA

502 — <MEDIA ASSET>

504 — <TITLE>BASEBALL_GAME_TEXAS_VS_NEW_YORK</TITLE>

506 — <ENVIRONMENTAL_CONDITIONS>

508 —     <WEATHER>

510 —         <DESCRIPTION_1> SUNNY </DESCRIPTION_1>

512 —         <DESCRIPTION_2> WINDY </DESCRIPTION_2>

514 —         <DESCRIPTION_3> HOT </DESCRIPTION_3>

516 —     </WEATHER>

518 —     <ACTION>

520 —         <DESCRIPTION_1> STABLE </DESCRIPTION_1>

522 —     </ACTION>

524 — </ENVIRONMENTAL_CONDITIONS>

526 — <PROGRESS>

528 —     <RUNTIME> 1:40:24 </RUNTIME>

530 —     <SCENE_TIME_REMAINING> 0:01:46 </SCENE_TIME_REMAINING>

532 — </PROGRESS>

534 — </MEDIA ASSET>

| | Vehicle Interior Feature | Equipped on Vehicle |
|---|---|---|
| 802 | Automatic Windows | Yes |
| 804 | Automatic Seat Heater | No |
| 806 | Heating/Cooling System | Yes |
| 808 | Exterior Thermometer | Yes |
| 810 | Automatic Sunroof | Yes |
| 812 | Automatic Wiper Fluid | No |
| 814 | Automatic Seat Adjustment | Yes |

FIG. 8A

| | Automatic Windows | Automatic Seat Heater | Heating/Cooling System | Exterior Thermometer | Automatic Sunroof | Automatic Wiper Fluid | Automatic Seat Adjustment |
|---|---|---|---|---|---|---|---|
| Sun | | x | x | x | x | | |
| Wind | x | | | x | x | | |
| Rain | | | | x | | x | |
| Cold | | x | x | | | | |
| Action Scene | | | | | | | x |

852 — Sun
854 — Wind
856 — Rain
858 — Cold
860 — Action Scene

METHODS AND SYSTEMS FOR PRODUCING THE ENVIRONMENTAL CONDITIONS OF A MEDIA ASSET IN A VEHICLE

CROSS-REFERENCE TO RELATED APPLICATIONS

This application is a continuation of U.S. patent application Ser. No. 13/601,222, filed Aug. 31, 2012, (allowed), which is hereby incorporated by reference herein in its entirety.

BACKGROUND OF THE INVENTION

The amount of content a user may enjoy while occupying a vehicle continues to increase. All types of vehicles, from airplanes to automobiles, are increasingly being outfitted with display devices, which allow users to view media assets while in the vehicle. Moreover, portable devices such as laptop computers, tablet computers, and smartphones also allow users to view media assets while in a vehicle. By connecting to the vehicle (e.g., via Bluetooth technology), the portable devices may transmit audio or video data through the audio and video systems of the vehicle.

In addition to increasing the accessibility of audio and video content in vehicles, vehicles are routinely customized with features to increase the comfort of the user while in the vehicle. For example, typical vehicles offer climate control systems such as heating and cooling mechanisms and temperature regulated devices (e.g., heated steering wheel or seats). In addition, vehicles increasingly feature automatic features such as power windows, power seats, power sunroofs, etc. All of these features combine to allow a user to individualize his or her comfort level and to maximize his or her vehicular experience.

Despite the increasing automatization of interior features of vehicles as well as the increasing accessibility of media asset while in a vehicle, the interior features of vehicles have not been used to enhance the media asset experience of a user accessing a media asset within a vehicle.

SUMMARY OF INVENTION

Accordingly, methods and systems are disclosed herein for a guidance application capable of coordinating the interior features of a vehicle (e.g., the heating/cooling system, automatic windows, automatic seats, automatic sunroof, seat heaters, etc.) to produce the current environmental conditions (e.g., sunshine, heat, wind, etc.) displayed in a media asset being accessed in the vehicle.

In some embodiments, the guidance application receives media information associated with a media asset being accessed in the vehicle. The guidance application determines the environmental condition of a current progress point in the media asset based at least in part on the media information. The guidance application cross-references the environmental condition of the current progress point in the media asset with a database of vehicle interior feature information associated with media asset environmental conditions to identify a vehicle interior feature to use to produce the environmental condition, and generates the environmental condition of the current progress point, in the media asset using the identified vehicle interior feature.

For example, a user may be accessing a movie streamed to a user device (e.g., a smartphone) while riding in an automobile. A guidance application may receive metadata associated with the movie that indicates the current movie scene features characters trapped in an arctic wilderness. The guidance application then determines which of the interior features of the vehicle may be utilized to re-produce the conditions facing the characters in the movie (e.g., cold temperatures). After identifying the cooling system of the automobile as suitable for replicating the conditions, the guidance application directs the cooling system to lower the temperature inside the automobile. By lowering the temperature inside the automobile, the user may receive a more interactive movie experience, increasing the enjoyment of the movie by the user.

In some embodiments, the guidance application may use multiple vehicle interior features to simulate the environmental conditions of a media asset. For example, the guidance application may direct the vehicle windows to open (producing high-speed wind) and the vehicle seat to move forward and back (producing rapid movements) to simulate a media asset currently featuring a high-speed chase sequence. The guidance application may determine the interior features equipped in the vehicle by retrieving the registration information associated with the vehicle. Alternatively, the guidance application may identify all available interior features from which environmental conditions may be generated via a scan feature triggered upon activation of the guidance application.

In some embodiments, a vehicle may have multiple occupants, but only some of the occupants are accessing the media asset. For example, the driver of an automobile may not wish to experience the environmental condition of a media asset being viewed by passengers. Therefore, in some embodiments, the guidance application may determine the position of users accessing the media asset and direct only vehicle interior features to affect them (e.g., opening only rear windows for a user situated in the back seat of an automobile).

The guidance application may also consider the conditions exterior to the vehicle, when generating the environmental conditions of a media asset. For example, if the user is accessing a media asset featuring characters on a sunny day, the guidance application may determine whether or not the sun is shining outside the vehicle. If the sun is shining, the guidance application may open a vehicle sunroof to replicate the sunshine experienced by the characters in the media asset.

In some embodiments, the guidance application may determine the environmental condition of a current progress point in the media asset by processing an environmental condition indicator received in the media information associated with the media asset. For example, in some embodiments, the environmental condition may be indicated by metadata transmitted with the media asset. In some embodiments, the guidance application may process images displayed by the media asset using image recognition technology. For example, the guidance application may determine that the sun is shining in the media asset by analyzing shadows near the characters.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an exemplary data structure for data associated with a media asset, which may be used to determine the environmental conditions of a media asset in accordance with some embodiments of the disclosure;

FIG. 8A shows an exemplary data structure, which may be produced by a guidance application to determine the vehicle interior features available for use in generating environmental conditions in accordance with some embodiments of the disclosure; and FIG. 8B shows an exemplary data structure, which may be used by a guidance application to determine the vehicle interior features suitable for generating environmental conditions in accordance with some embodiments of the disclosure.

DETAILED DESCRIPTION OF DRAWINGS

Methods and systems are disclosed herein for a guidance application capable of coordinating the interior features of a vehicle (e.g., the heating/cooling system, automatic windows, automatic seats, automatic sunroof, seat heaters, etc.) to produce the environmental conditions (e.g., sunshine, heat, wind, etc.) displayed in the current progression point of a media asset being accessed in the vehicle.

For a user wishing to enhance his or her media asset experience, the amount of options available in any given vehicle can be substantial. However, a user may not know which interior features to activate to replicate an environmental condition at a given progression point in a media asset. Moreover, even if a user does know which interior features to use, the coordination of the interior features with the environmental conditions may prove distracting to their enjoyment of the media asset. Consequently, many users may desire a form of guidance through an interface that automatically coordinates the interior features of a vehicle with an environmental condition. An application that provides such guidance is referred to herein as a guidance application or, sometimes, an interactive media guidance application or a media guidance application.

Figure 1:
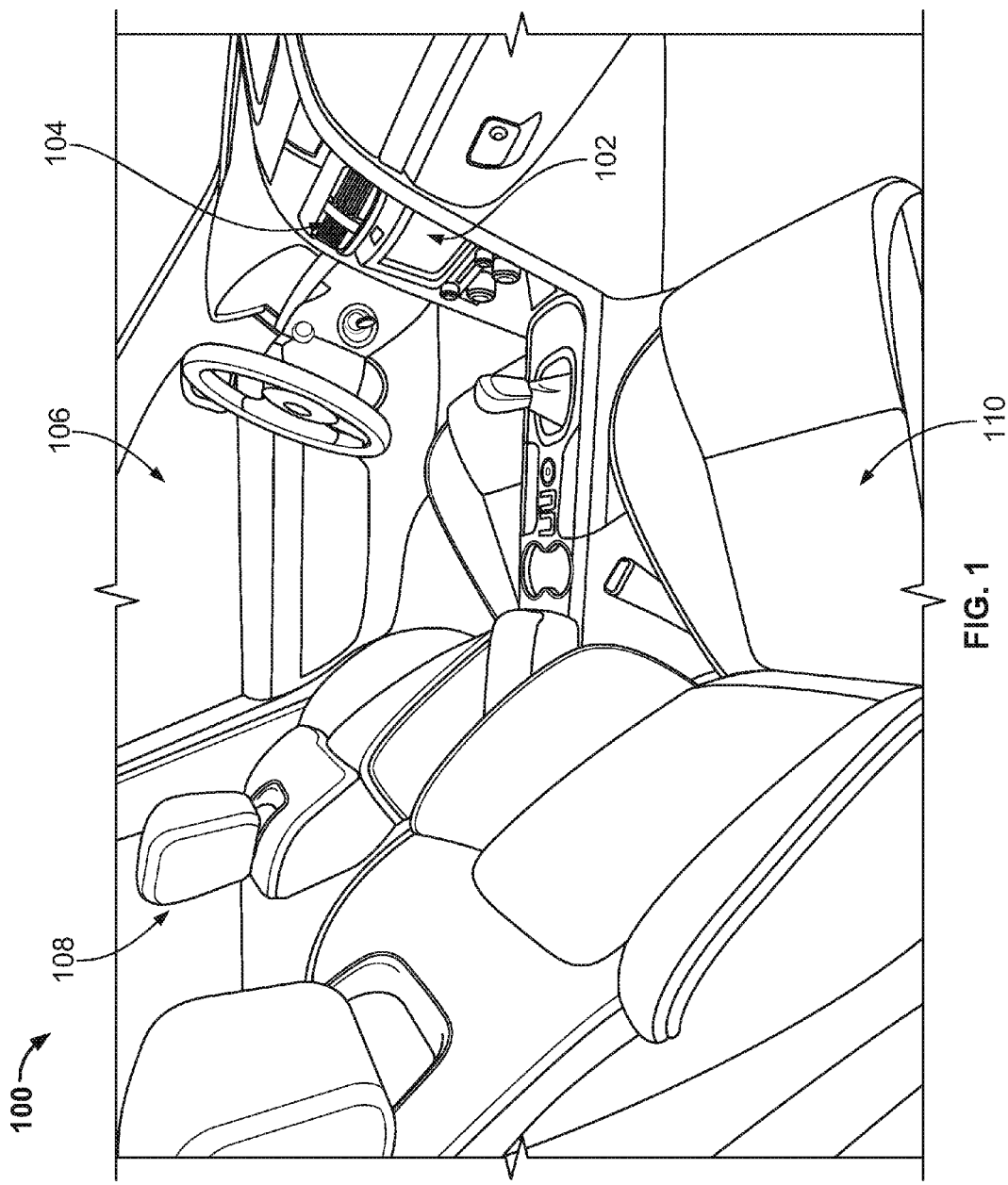
FIG. 1 shows an illustrative vehicle equipped with a guidance application that may be used to generate environmental conditions of a media assets in accordance with some embodiments of the disclosure.

FIG. 1 shows a vehicle 100 equipped with a guidance application that may be used to generate environmental conditions of a media asset in accordance with some embodiments of the disclosure. A user in vehicle 100 may use media component 102 to access a media asset. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, media component 102 may be an audio and/or video system incorporated into vehicle 100 or user equipment used to access a media asset while using vehicle 100. With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a traditional television or computer. Consequently, a guidance application may be available on these devices, as well. The guidance applications may be provided as on-line applications (i.e., provided on a website), or as stand-alone applications or clients on user equipment devices. Various devices and platforms that may implement guidance applications are described in more detail below.

Vehicle 100 may have numerous interior features used to generate the environmental conditions of a current progress point of a media asset. As used herein, an "interior feature" is any feature used by the guidance application to generate (e.g., by replicating, simulating, and/or producing) an environmental condition of a media asset. Interior features may include any device, vehicle option (whether equipped on standard vehicle models or customized), or system of vehicle 100, whether or not the device is located within vehicle 100 or within a passenger compartment. For example, an interior feature may be located within the mechanisms or engine of a vehicle (e.g., heating/cooling system 104). In addition, an interior feature may form or create a boundary for interior or cargo space of vehicle 100 (e.g., windows 106 or sunroof (not shown)). Interior features may be in direct contact with a user (e.g., headrest 108 or seat 110), may be included within a feature in contact with a user (e.g., a heater located within seat 110), or may be located on the exterior of vehicle (e.g., windshield wipers and fluid (not shown) or external thermometers (not shown)). Interior features may be equipped in vehicle 100 upon manufacturing (e.g., by the manufacturer of vehicle 100) or may be added as modifications and/or upgrades after the manufacturing of vehicle 100 (e.g., by the manufacturer or third party).

Vehicle 100 may include any type of vehicle (e.g., automobiles, airplanes, motorcycles, recreational vehicles, boats, helicopters, or any other device or equipment capable of transporting and/or being occupied by a user). In some embodiments, vehicle 100 may determine the position of a user accessing a media asset via the guidance application. For example, in some embodiments, vehicle 100 may use sensors in a seat 110 or other interior feature (e.g., a seat belt) to detect a user. In some embodiments, users may input their position via a user interface (e.g., user input interface 312 (FIG. 3)) incorporated into or accompanying media component 102 either by direct input into the user interface (e.g., activating the system via selectable option 204 (FIG. 2) to affect particular positions) or passive detection schemes (e.g., detecting a user accessing seat-belt, or a headphone jack corresponding to a particular seat). In such embodiments, the guidance application may direct the interior features to only generate environmental conditions at a particular position within the vehicle (e.g., a particular seat on an airplane or bus).

In some embodiments, vehicle 100 may include particular zones or areas which correspond to the location of a user. In some embodiments, these locations may correspond to the locations of seat belts or climate control zones. The interior features of vehicle may be equipped to alter environmental conditions for one or more zones at a time. For example, the driver of vehicle 100 may not wish to experience the environmental condition of a media asset being viewed by passengers on one or more media components 102. The guidance application may determine the position of users accessing the media asset and direct vehicle interior features (e.g., a seat heater in the passenger seat of the vehicle may warm to generate an environmental condition displayed in a media asset playing on media component 102, while a corresponding seat heater in the driver seat of the vehicle may not).

As used herein, an "environmental condition" refers to any condition displayed in a media asset accessed by a user in a vehicle that may be reproduced by the interior features of the vehicle to enhance the media experience of the user. In some embodiments, the environmental conditions may include weather or climate conditions. For example, heating/cooling system 104 may be used to warm or cool the user in the vehicle in response to detecting that the media asset is featuring a warm or cool scene. In another example, the guidance application may direct windshield wipers or fluid to be activated in response to detecting that the media asset is featuring rain.

In some embodiments, the environmental conditions may include physical conditions. For example, seat 110 may move forward and backward or vibrate in response to detecting an action sequence in the media asset featuring collisions or abrupt directional changes (e.g., a high speed car chase). In some embodiments, the environmental conditions may include lighting and theatrical conditions. For example, during a suspenseful scene in a media asset the guidance application may dim overhead or cabin lights to generate a particular ambiance for the users.

The particular environmental conditions of the current progress point of the media asset may be detected by receiving or processing information associated with the media asset. For example, a user may be accessing a media asset (e.g., a movie) streamed to a media component 102 (e.g., a smartphone) while occupying vehicle 100 (e.g. automobile). A guidance application may receive metadata (e.g., as discussed in relation to FIGS. 5 and 6 below) associated with the media asset that indicates the current movie scene features characters trapped in an arctic wilderness.

In some embodiments, the guidance application receives media information associated with a media asset being accessed in the vehicle. As used herein, "media information" refers to data associated with the media asset that may be used by the guidance application to determine the environmental conditions of a current progress point in a media asset. Media information may be transmitted with the media asset (e.g., as metadata) or may be generated by processing the media asset. For example, media information may include condition identifiers, which may include signals, metadata, triggers, flags, or data packets associated with the media asset that may indicate to the guidance application that the media asset has a particular environmental condition. In some embodiments, identifiers may be located in data structures received with the media asset (e.g., data structure 500 (FIG. 5)).

In some embodiments, the guidance application may compare the condition identifiers to an external or internal database (e.g., a look-up table listing condition identifiers and the environmental condition with which they correspond). In some embodiments, the guidance application may process media information or the media asset to determine the environmental conditions of a media asset. For example, in some embodiments, the guidance application may use image recognition technology to determine the environmental conditions. For example, the guidance application could detect whether or not characters in the media asset are wearing coats and hats (e.g., indicating that the environmental condition is cold).

The guidance application may cross-references a database of vehicle interior feature information associated with media asset environmental conditions to identify a vehicle interior feature to use to produce the environmental condition (e.g., as shown and described in relation to FIGS. BA and BB). The guidance application may determine which of the interior features (e.g., heating/cooling system 104 and/or heaters in seat 110) of vehicle 100 may be utilized to re-produce (or at least not inhibit) the conditions facing the characters in the movie (e.g., cold temperatures). After identifying the environmental conditions of a current progress point (e.g., via process 700 (FIG. 7), the guidance application may identify the particular interior features suitable for cooling vehicle 100 to replicate the environmental conditions of the media asset. For example, the guidance application directs the heating/cooling system 104 to lower the temperature inside vehicle 100 as well as deactivate a heater in seat 110 (if active). By lowering the temperature inside vehicle 100 and deactivating the heater in seat 110 (if active), the user may receive a more interactive movie experience, increasing the enjoyment of the media asset by the user.

In some embodiments, the guidance application may also determine the conditions exterior to vehicle 100. For example, the guidance application may determine that the external temperature is cold. Therefore, the environmental conditions of the media asset (e.g., cold temperatures) may be generated by opening windows 106. In some embodiments, the guidance application may determine the exterior conditions based on information received (e.g., via a transmission of weather information from application source 422 (FIG. 4)) or using sensors included in vehicle 100 (e.g., an exterior thermometer). Alternatively, for example, if the user is accessing a media asset featuring characters on a sunny day, the guidance application may determine whether or not the sun is shining outside vehicle 100. If the sun is shining, the guidance application may open a vehicle sunroof to replicate the sunshine experienced by the characters in the media asset and, therefore, generate the environmental conditions.

Figure 2A:
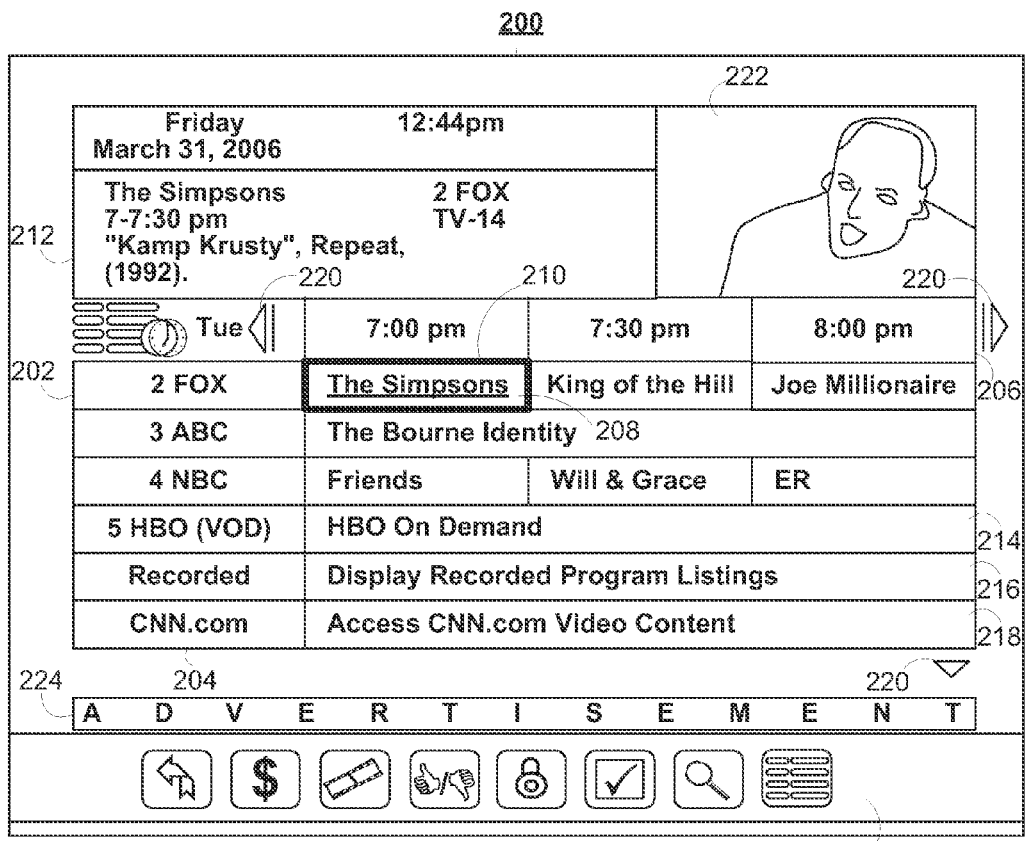
FIG. 2A shows an illustrative guidance application that may be used to display media assets in accordance with some embodiments of the disclosure.
Figure 2B:
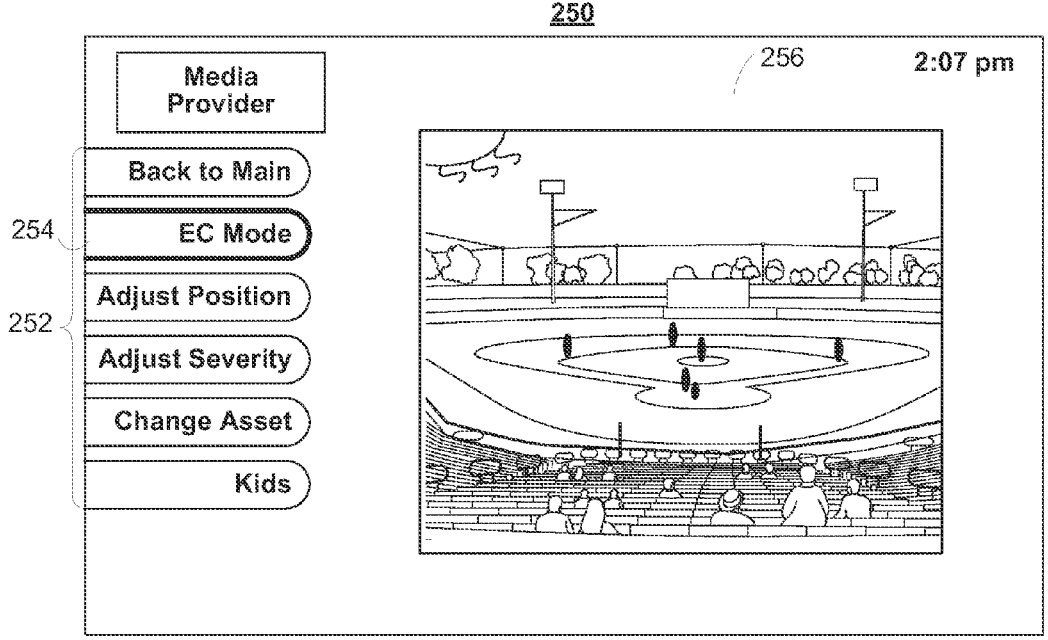
FIG. 2B shows an illustrative guidance application that may be used to activate the simulation of environmental conditions occurring in a media asset in accordance with some embodiments of the disclosure.

FIGS. 2A-2B show illustrative display screens that may be used to provide media guidance data by a guidance application. In some embodiments, a guidance application may be implemented on media component 102. The guidance application may be interactive and allow a user to access and/or modify a media asset or the environmental conditions generated by the internal features of the vehicle. Interactive guidance applications may take various forms depending on the content for which they provide guidance. One typical type of guidance application is an interactive television program guide. Interactive television program guides (sometimes referred to as electronic program guides) are well-known guidance applications that, among other things, allow users to navigate among and locate many types of content or media assets. Interactive guidance applications may generate graphical user interface screens that enable a user to navigate among, locate and select content.

One of the functions of the guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

The display screens shown in FIGS. 1-2 may be implemented on any suitable user equipment device or platform or may be accessed via a display screen incorporated into a vehicle (e.g., media component 102). While the displays of FIGS. 2A-2B are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 2A shows illustrative grid program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other guidance application display screens of the embodiments described herein.

Options region 226 may allow the user to access different types of content, guidance application displays, and/or guidance application features (e.g., generating environmental conditions associated with the current progress point of a media asset at a particular position in a vehicle as discussed above). Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options. In addition, the options may include the ability to activate or de-activate any of the interior features or generate the environmental conditions discussed above.

The guidance application may be personalized based on a user's preferences. A personalized guidance application allows a user to customize displays and features to create a personalized "experience" with the guidance application. This personalized experience may be created by allowing a user to input these customizations and/or by the guidance application monitoring user activity to determine various user preferences. Users may access their personalized guidance application by logging in or otherwise identifying themselves to the guidance application. Customization of the guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The guidance application may allow a user to provide user profile information or may automatically compile user profile information. The guidance application may, for example, monitor the content the user accesses and/or other interactions the user may have with the guidance application. For example, the guidance application may monitor the enjoyment of a media experience based on the severity or amount of environmental conditions experience by a user to adjust the level (e.g., how cold a vehicle becomes while generating an environmental condition) of the environmental conditions during subsequent uses. Additionally, the guidance application may obtain all or part of other user profiles that are related to a particular user (e.g., from other websites on the Internet the user accesses, such as www.allrovi.com, from other guidance applications the user accesses, from other interactive applications the user accesses, from another user equipment device of the user, etc.), and/or obtain information about the user from other sources that the guidance application may access. As a result, a user can be provided with a unified guidance application experience across the user's different user equipment devices. This type of user experience is described in greater detail below in connection with FIG. 4. Additional personalized guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Display 250, which may appear on media component 102 (FIG. 1) includes selectable options 252 for content information organized based on various criteria, including but not limited to, directing the guidance application regarding the features discussed above. For example, selectable options 252 include options for returning to a main menu, activating an environmental condition mode, adjusting the position of a user accessing a media asset (e.g., where the interior features should direct the environmental conditions), adjusting the severity of the generated environmental conditions (e.g., adjusting how cold the vehicle may become), changing the media asset displayed, and activating a "Kids" mode (e.g., a mode in which the generated environmental conditions are safe for children). For example, in display 250, "EC Mode" option 254 is selected, thus generating environmental conditions featured in listing 256.

In addition, in display 250 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing.

Figure 3:
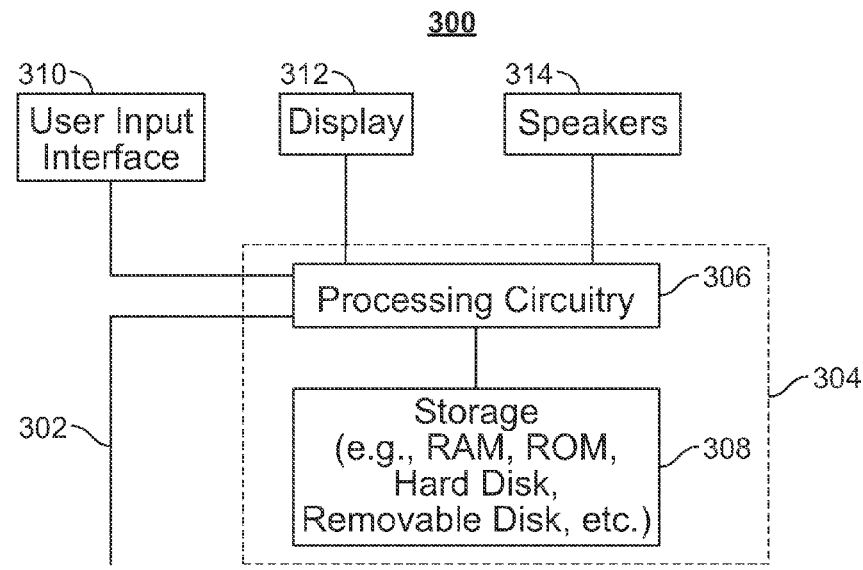
FIG. 3 is a block diagram of an illustrative user equipment device in accordance with some embodiments of the disclosure.

Users may access content and the guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter 'I/O') path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a guidance application stored in memory (i.e., storage 308). Specifically, control circuitry 304 may be instructed by the guidance application to perform the functions discussed above and below. For example, the guidance application may provide instructions to control circuitry 304 to generate the media guidance displays. In some implementations, any action performed by control circuitry 304 may be based on instructions received from the guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
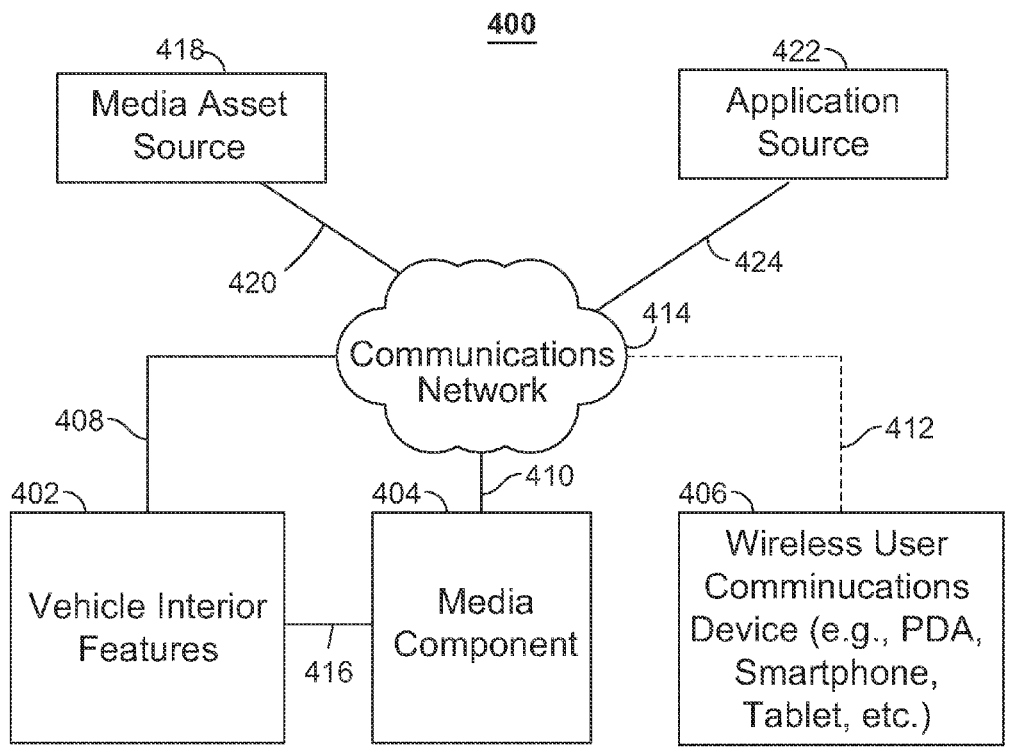
FIG. 4 is a block diagram of an illustrative media system in accordance with some embodiments of the disclosure.

User equipment device 300 of FIG. 3 can be implemented in system 400 of FIG. 4 on vehicle interior features 402, media component 404, or wireless user communications device 406. For simplicity, these devices may be referred to herein collectively as user equipment or user equipment devices, and may be substantially similar to user equipment devices described above. User equipment devices, on which a guidance application may be implemented, may function as a stand-alone device or may be part of a network of devices. Various network configurations of devices may be implemented and are discussed in more detail below. For example, vehicle interior features 402 and media component 404 may be included on a vehicle. In addition, a wireless user communications device 406 may be connected to, or integrated with, a vehicle. While vehicle interior features 402, media component 404, or wireless user communications device 406 may be separated or manufactured independently, the user equipment may be integrated and function together to generate the environmental conditions of a media asset. Therefore, it should be noted that any one or more of vehicle interior features 402, media component 404, or wireless user communications device 406 may be integrated with each other.

In some embodiments, media component 404 may include wireless user communications device 406. In some embodiments, wireless user communications device 406 may be connected to a vehicle (e.g., vehicle 100 (FIG. 1) via communications network 414 as indicated by path 412. Furthermore, in some embodiments, a vehicle (e.g., vehicle 100 (FIG. 1)) may connect vehicle interior features 402 and media component 404 as indicated by path 416.

A user equipment device utilizing at least some of the system features described above in connection with FIG. 3 may be Internet-enabled allowing for access to Internet content, include a tuner allowing for access to television programming, or include other means for accessing communication network 414 (FIG. 4)). Furthermore, the guidance application may have the same layout on various different types of user equipment or may be tailored to the display capabilities of the user equipment.

In system 400, there may be more than one of each type of user equipment device but only one of each is shown in FIG. 4 to avoid overcomplicating the drawing. For example, in some embodiments, the guidance application may generate multiple environmental conditions for different users in the same vehicle, in which each environmental condition corresponds to a different media asset (or different point of playback) of a media asset. In addition, each user may utilize more than one type of user equipment device and also more than one of each type of user equipment device.

In some embodiments, a user equipment device (e.g., media component 404 and wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent guidance application settings across vehicle devices and remote devices. Settings include those described herein, as well as channel and program favorites, programming preferences that the guidance application utilizes to make programming recommendations, display preferences, and other desirable guidance settings related to generating environmental conditions. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, vehicle interior features 402, media component 404, and/or wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path (e.g., accessed via Bluetooth Technology) and paths 408 and 410 are drawn as solid lines to indicate they are wired paths within a vehicle (although these paths may be wireless paths, if desired). Communications with the user equipment devices may be provided by one or more of these communications paths, but are shown as a single path in FIG. 4 to avoid overcomplicating the drawing.

Although communications paths are not drawn between media component 404 and wireless user communications device 406, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, Wifi technology, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media asset source 418 and application source 422 coupled to communications network 414 via communication paths 420 and 424, respectively. Paths 420 and 424 may include any of the communication paths described above in connection with paths 408, 410, and 412. Communications with the media asset source 418 and application source 422 may be exchanged over one or more communications paths, but are shown as a single path in FIG. 4 to avoid overcomplicating the drawing. In addition, there may be more than one of each of media asset source 418 and application source 422, but only one of each is shown in FIG. 4 to avoid overcomplicating the drawing. (The different types of each of these sources are discussed below.) If desired, media asset source 418 and application source 422 may be integrated as one source device. Although communications between sources 418 and 422 with user equipment devices 402, 404, and 406 are shown as through communications network 414, in some embodiments, sources 418 and 422 may communicate directly with user equipment devices 402, 404, and 406 via communication paths (not shown) such as those described above in connection with paths 408, 410, and 412.

Media asset source 418 may include one or more types of content distribution equipment, including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media asset source 418 may be the originator of content (e.g., a television broadcaster, a Webcast provider, etc.) or may not be the originator of content (e.g., an on-demand content provider, an Internet provider of content of broadcast programs for downloading, etc.). Media asset source 418 may include cable sources, satellite providers, on-demand providers, Internet providers, over-the-top content providers, or other providers of content. Media asset source 418 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Application source 422 may provide guidance data, such as the media guidance data described above or information related to a particular vehicle (e.g., registration information or the particular interior features equipped on the vehicle). Guidance application data may be provided to the user equipment devices using any suitable approach. In some embodiments, the guidance application may receive data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from application source 422 may be provided to users' equipment using a client-server approach. For example, a user equipment device may pull guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance data may be provided to the user equipment with any suitable frequency (e.g., continuously, daily, a user-specified period of time, a system-specified period of time, in response to a request from user equipment, etc.). Application source 422 may provide user equipment devices 402, 404, and 406 the guidance application itself or software updates for the guidance application.

Guidance applications may be, for example, stand-alone applications implemented on user equipment devices. For example, the guidance application may be implemented as software or a set of executable instructions which may be stored in storage 308, and executed by control circuitry 304 of a user equipment device 300. In some embodiments, guidance applications may be client-server applications where only a client application resides on the user equipment device, and server application resides on a remote server. For example, guidance applications may be implemented partially as a client application on control circuitry 304 of user equipment device 300 and partially on a remote server as a server application (e.g., application source 422) running on control circuitry of the remote server. When executed by control circuitry of the remote server (such as application source 422), the guidance application may instruct the control circuitry to generate the guidance application displays and transmit the generated displays to the user equipment devices. The server application may instruct the control circuitry of the application source 422 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YOUTUBE is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute guidance applications (e.g., web-based applications or cloud-based applications), or the content can be displayed by guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance.

In some embodiments, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more media asset sources 416 and one or more application sources. For example, the user equipment devices may be provided access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

The guidance application may use various content capture and processing devices, such as camcorders, digital cameras with video mode, audio recorders, mobile phones, and handheld computing devices, to record, process, or monitor the content of a media asset. Furthermore, the guidance application may include one or more image recognition applications to monitor the environmental conditions displayed on a media asset. The use of image recognition technology will be discussed below in relation to FIG. 6.

Cloud resources may be accessed by a user equipment device using, for example, a web browser, a guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an exemplary data structure for data transmitted with a media asset in accordance with some embodiments of the disclosure. In some embodiments, data structure 500 may include the environmental condition indicators as discussed in relation to FIG. 1. In some embodiments, the guidance application implemented on media component 404 (FIG. 4) or wireless user communications device 406 (FIG. 4) may receive and process data structure 500 from media asset source 418 (FIG. 4), application source 422 (FIG. 4), or any other device or location accessible via communication network 414 (FIG. 4). For example, data structure 500 includes a plurality of lines. In some embodiments, the presence of a particular value or values in data structure 500 may indicate a particular environmental condition is appearing in the current progress point of a media asset.

Data structure 500 includes line 502. Line 502 indicates the beginning of media information in data structure 500 associated with a media asset, and line 534 indicates the end of media information associated with a media asset in data structure 500. Line 504 indicates the title of the media asset associated with data structure 500. For example, line 502 may be processed by control circuitry 304 (FIG. 3) to indicate that the received data relates to a movie. For example, data structure 500 may correspond to a movie displayed in display 250 (FIG. 2) on media component. 404 (FIG. 4) or wireless user communications device 406 (FIG. 4).

Line 506 indicates the beginning of environmental conditions indicators associated with the media asset. Line 524 indicates the end of environmental conditions indicators. In some embodiments, the guidance application may use the environmental conditions indicators to determine, which interior features to activate as discussed in relation to FIG. 1. In data structure 500, the environmental condition indicators are divided into two groups, "Weather" (e.g., line 508) and "Action" (e.g., line 518). It should be noted that the groups described herein are illustrative only and are not limiting. Additional groups (or fewer groups) may be used in accordance with this disclosure.

Figure 7:
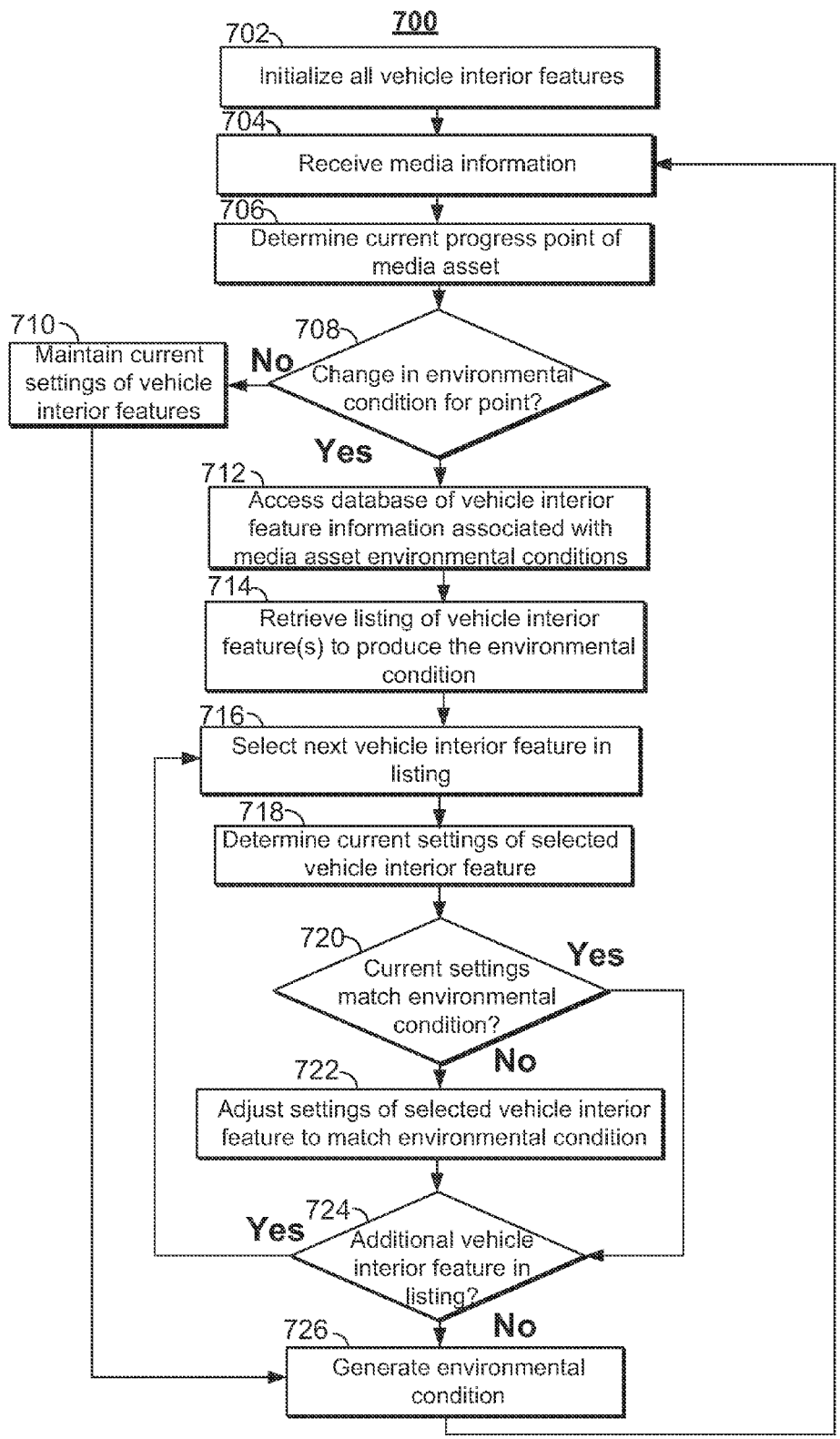
FIG. 7 is a flow-chart of illustrative steps involved in using a guidance application to generate an environmental condition of a current progress point in the media asset in accordance with some embodiments of the disclosure.

Lines 508 through 516 indicate the particular weather occurring in the media asset at the current point of progress. Line 508 indicates the beginning of environmental conditions associated with "Weather," and line 516 indicates the end of environmental conditions associated with "Weather." Line 510 indicates that the weather is "Sunny." Line 512 indicates that the weather is "Windy." Line 514 indicates that the weather is "Hot." In some embodiments, the guidance application may use this information to determine, which interior features should be activated as discussed in relation to process 700 (FIG. 7). For example, to generate the environmental conditions, the guidance application may open the vehicle sunroof or activate the cabin lighting to simulate "Sunny" conditions. The guidance application may open the windows of the vehicle (e.g., window 106 (FIG. 1)) while the vehicle is moving to simulate "Windy" conditions, and the guidance application may increase the vehicle temperature (e.g., via heating/cooling system 104 (FIG. 1)) to simulate "Hot" conditions.

Lines 518 through 522 indicate the particular action occurring in the media asset at the current point of progress. Line 508 indicates the beginning of environmental conditions associated with "Action," and line 516 indicates the end of environmental conditions associated with "Action," Line 510 indicates that the action is "Stable." In some embodiments, the guidance application may use this information to determine which interior features should be activated as discussed in relation to process 700 (FIG. 7). For example, to generate "Stable" environmental conditions, the guidance application may not move the seat (e.g., seat 110 (FIG. 1)) during the current position point of the media asset. Alternatively, if the environmental condition was "Unstable" (e.g., representing the current progress point in the media asset was a car chase or fast-moving action sequence), the guidance application may move seat 110 (FIG. 1) back and forth or cause vibrations in seat 110 (FIG. 1) and headrest 108 (FIG. 1).

Line 526 through 532 indicates the progress information of the media asset. For example, in some embodiments, the progress information may be used by the guidance application to determine the current progress point of the media asset. For example, line 528 indicates the runtime of the current media asset. In some embodiments, the guidance application may compare this information to a database of information describing the environmental conditions of a particular runtime in a particular media asset. By comparing the information in the database to the runtime of the media asset, the guidance application may determine what particular environmental conditions are occurring in the media asset at the current progress point.

Alternatively, the guidance application may receive the media information in real-time as the media asset is played back. Each point of progress of the media asset may correspond to a particular data structure of media information. For example, in some embodiments, data structure 500 may correspond to the one hour, forty minute, and twenty-four second mark of the media asset. The guidance application may, therefore, generate environmental conditions using the vehicle interior features in real-time as the as media information for each point in the media asset is received.

Data structure 500 also includes line 530. Line 530 indicates to the guidance application the amount of time remaining in a current scene. The guidance application may use this information to determine the length of time that a particular environmental condition should be generated and/or maintained. For example, based on data structure 500, the guidance application may detect that the current environmental conditions may be maintained for one minute and forty-six seconds.

It should be noted that the media information displayed in data structure 500 is not limiting, and in some embodiments, the media information as described in data structure 500 may be replaced or supplemented by other media information as discussed in the disclosure.

Figure 6:
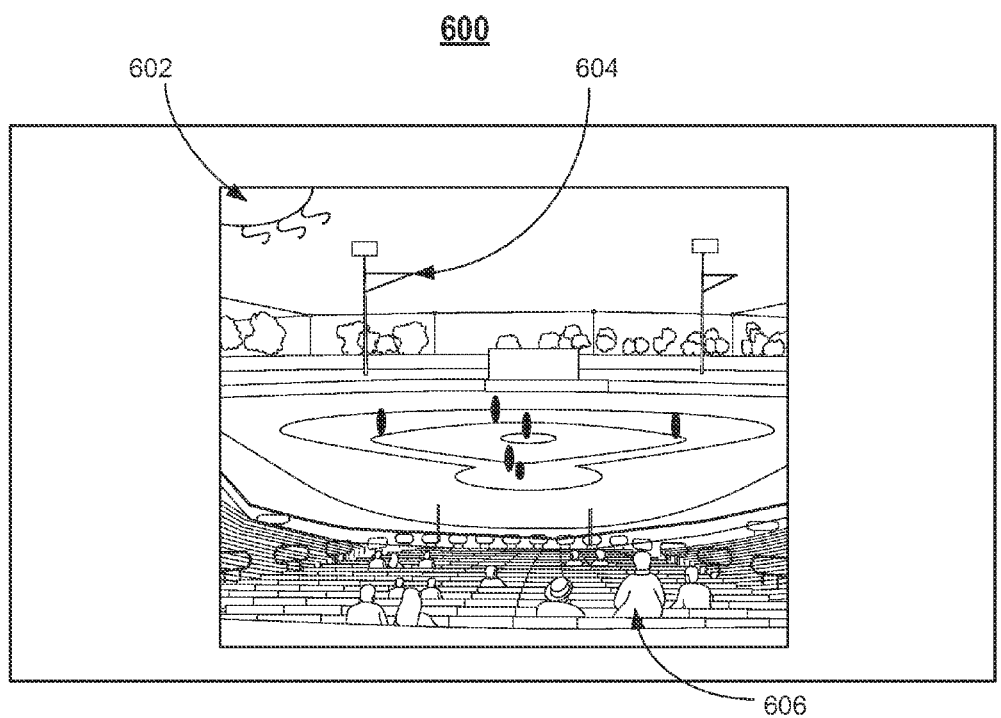
FIG. 6 shows a display of a media asset, which may be processed by the guidance application to determine the environmental conditions of the media asset in accordance with some embodiments of the disclosure.

FIG. 6 shows a display of a media asset, which may be processed by the guidance application to determine the environmental conditions of the media asset in accordance with some embodiments of the disclosure. FIG. 6 shows display 600. Display 600 may result from a media asset being accessed by a user on media component 404 (FIG. 4) and/or wireless user communications device 406 (FIG. 4).

In some embodiments, the guidance application may use image recognition technology as discussed above to determine the environmental conditions of the characters in the media asset. For example, by processing the image shown in display 600, the guidance application may identify portion 602 shows the sun is shining. The guidance application may interpret this as indicating the weather is "Sunny." Portion 604 shows a flag is being blown by wind. The guidance application may interpret this as indicating that the weather is "Windy." Portion 606 shows characters in the media asset are not wearing heavy jackets. The guidance application may interpret this as indicating that the weather is "Hot." The guidance application may also identify movement in the media asset and move seat 110 (FIG. 1) back and forth or cause vibrations in seat 110 (FIG. 1) and headrest 108 (FIG. 1) to simulate the movement.

In some embodiments, the guidance application may use this information to determine which interior features should be activated as discussed in relation to process 700 (FIG. 7). For example, to generate the environmental conditions, the guidance application may open the vehicle sunroof or activate the cabin lighting to simulate "Sunny" conditions. The guidance application may open the windows of the vehicle (e.g., window 106 (FIG. 1)) while the vehicle is moving to simulate "Windy" conditions, and the guidance application may increase the vehicle temperature (e.g., via heating/cooling system 104 (FIG. 1)) to simulate "Hot" conditions.

In some embodiments, the guidance application may also cross-reference characteristics shown in the media asset with a database to determine a particular environmental condition. For example, in some embodiments, the image recognition technology may detect clouds shown in the media asset. Based on the presence, and/or number, of clouds in the media asset, the guidance application may determine a particular level of sun-light that should be generated according to the database. In another example, the guidance application may determine a particular visual characteristic of the media asset to determine an environmental condition. For example, the guidance application may determine the particular color, hue, and/or the brightness of the media asset, and cross-reference the color, hue, and/or brightness with a database to determine the particular environmental condition that should be generated. For example, a high level of brightness may indicate a particular level of sun-light that should be generated by the guidance application.

FIG. 7 is a flow-chart of illustrative steps involved in using a guidance application to generate an environmental condition of a current progress point in the media asset in accordance with some embodiments of the disclosure. FIG. 7 shows and describes process 700, which in some embodiments, may be used to generate environmental conditions of a current progress point in a media asset in a vehicle (e.g., vehicle 100 (FIG. 1)) using the interior features of the vehicle. Process 700 may be performed by a guidance application implemented on any of the devices and equipment shown and described in FIGS. 3-4.

At step 702, process 700 initializes all vehicle interior features. Initializing vehicle interior features may include deactivating all the vehicle interior features or returning the cabin of the vehicle to an initial state. At step 704, process 700 receives media information. For example, media information may be stored on, or retrieved from, a media asset, media asset source 418 (FIG. 4), application source 422 (FIG. 4), user equipment 402, 404, and/or 406 (FIG. 4), and/or any location or device accessible via communications network 414 (FIG. 4). In some embodiments, media information may include a data structure (e.g., data structure 500 (FIG. 5)), which includes environmental conditions of the current progress point of the media asset.

At step 706, process 700 determines a current progress point of the media asset. In some embodiments, the current progress point of the media asset may be determined based on the media information (e.g., line 528 of data structure 500 (FIG. 5)). At step 708, process 700 detects whether or not there is a change in the environmental condition of the current progress point in the media asset as compared to a previous progress point in the media asset. During an initial iteration, process 700 may compare the environmental conditions of the current progress point in the media asset to the environmental conditions of the initialized vehicle interior features. If no change is detected, process 700 maintains the current settings of the vehicle interior features at step 710 and continues to step 726.

If a change is detected, process 700 accesses a database of vehicle interior feature information associated with producing media asset environmental conditions. For example, in some embodiments, data structure 850 (FIG. 8B) may represent a data structure included in a database of vehicle interior feature information associated with producing media asset environmental conditions.

At step 714, process 700 retrieves a listing (e.g., data structure 850 (FIG. 8B)) of vehicle interior feature (s) to produce an environmental condition of a current progress point in a media asset. For example, as shown in data structure 850 (FIG. 8B), in some embodiments, the interior feature suitable for generating the environmental condition of "Sun" may be automatic seat heaters (e.g., within seat 110 (FIG. 1)) a heating/cooling system (e.g., heating/cooling system 104 (FIG. 1)), an exterior thermometer (e.g., for use in detecting the exterior conditions), and an automatic sunroof (e.g., via opening the sunroof if exterior conditions indicate the sun is shining outside the vehicle).

At step 716, process 700 selects a next vehicle interior feature. For example, data structure 850 (FIG. 8B) indicates that four interior features are suitable to produce the environmental condition of "Sun." Therefore, the process 700 selects the next vehicle interior feature in the listing. In the first iteration of step 716, the next vehicle interior feature may be the first vehicle interior feature in the listing.

At step 718, process 700 determines the current settings of the selected vehicle interior feature. During an initial iteration all vehicle interior features may have been initialized, deactivating them. However, during subsequent iterations vehicle interior features may have settings associated with environmental conditions associated with previous progress points. For example, a selected vehicle interior feature may currently be in use generating an environmental condition from a progress point occurring before the current progress point.

At step 720, process 700 determines if the current settings of the selected vehicle interior feature match the settings of the vehicle interior feature needed to generate the environmental condition of the current progress point of the media asset. If the current settings match the settings of the vehicle interior feature needed to generate the environmental condition of the current progress point of the media asset, process 700 continues to step 724.

If the current settings do not match the settings of the vehicle interior feature needed to generate the environmental condition of the current progress point of the media asset, process 700 continues to step 722. At step 722, process 700 adjusts the settings of the selected vehicle interior feature to match the settings of the vehicle interior feature needed to generate the environmental condition of the current progress point of the media asset.

At step 724, process 700 determines if there are additional vehicle interior features in the listing. If so, process 700 returns to step 716. If not, process 700 continues to step 726. For example, as shown in data structure 850 (FIG. 8B) in some embodiments there may be four interior features that are suitable for producing the environmental conditions of "Sun.". Therefore, in such an embodiment, step 716 may be repeated four times so that each interior feature may be selected.

At step 726, process 700 activates the selected interior features at the adjusted (or maintained) settings to generate the environmental condition of the current progress point of the media asset. After, or while, generating the environmental condition of the current progress point of the media asset, process 700 returns to step 704 and performs a subsequent iteration. The rate at which process 700 performs iterations may be continuous or may be according to predetermined time intervals. In some embodiments, the guidance application may receive media information alerting the guidance application to the time remaining before a scene change (e.g., line 530 (FIG. 5)). In such embodiments, the guidance application may perform iterations upon the beginning of each scene and maintain the environmental condition throughout the scene.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

FIG. 8A shows an exemplary data structure, which may be produced by a guidance application to determine the vehicle interior features available for use in generating environmental conditions in accordance with some embodiments of the disclosure. To generate the environmental conditions of the current progress point of a media asset, the guidance application may direct various interior features of a vehicle to alter or modify the environmental conditions within the vehicle. The guidance application may determine the interior features equipped in the vehicle by retrieving the registration information associated with the vehicle. Alternatively, the guidance application may identify all available interior features from which environmental conditions may be generated via a scan feature triggered upon activation of the guidance application.

Data structure 800 is an example of a data structure that may be referenced by a guidance application in accordance with this disclosure. Line indicates that the vehicle (e.g., vehicle 100 (FIG. 1)) is equipped with automatic windows (e.g., window 106 (FIG. 1)). Line 804 indicates that the vehicle is not equipped with an automatic seat heater (e.g., within seat 110 (FIG. 1)). Line 806 indicates that the vehicle is equipped with a heating/cooling system (e.g., heating/cooling system 104 (FIG. 1)). Line 808 indicates that the vehicle is equipped with an exterior thermometer (e.g., for use in detecting the exterior conditions). Line 810 indicates that the vehicle is equipped with an automatic sunroof. Line 812 indicates that the vehicle is not equipped with automatic wiper fluid. Line 814 indicates that the vehicle is equipped with automatic seat adjustment (e.g., for use on seat 110 (FIG. 1)).

Data structure 800 may be stored on, or retrieved from, media asset source 418 (FIG. 4), application source 422 (FIG. 4), user equipment 402, 404, and/or 406 (FIG. 4), and/or any location or device accessible via communications network 414 (FIG. 4).

FIG. 8B shows an exemplary data structure, which may be used by a guidance application to determine the vehicle interior features suitable for generating environmental conditions in accordance with some embodiments of the disclosure. In some embodiments, the guidance application may cross-referencing the environmental condition of the current progress point in the media asset with a database of vehicle interior feature information associated with media asset environmental conditions to identify a vehicle interior feature to use to produce the environmental condition. In some embodiments, data structure 850 may represent a data structure stored on a database, which includes a database of vehicle interior feature information for use in producing environmental conditions.

Line 852 indicates that suitable interior features for generating the environmental condition of "Sun" may be automatic seat heaters (e.g., within seat 110 (FIG. 1)), heating/cooling system (e.g., heating/cooling system 104 (FIG. 1)), exterior thermometer (e.g., for use in detecting the exterior conditions), and an automatic sunroof (e.g., via opening the sunroof if exterior conditions indicate the sun is shining outside the vehicle).

Line 854 indicates that suitable interior features for generating the environmental condition of "Wind" are automatic windows (e.g., window 106 (FIG. 1)), exterior thermometer (e.g., for use in detecting the exterior conditions), and an automatic sunroof (e.g., via opening the sunroof if exterior conditions indicate the sun is shining outside the vehicle). Line 856 indicates that suitable interior features for generating the environmental condition of "Rain" are an exterior thermometer and an automatic wiper fluid (e.g., via imitating rain falling on the windshield of the vehicle).

Line 858 indicates that suitable interior features for generating the environmental condition of "Cold" may be automatic seat heaters (e.g., within seat 110 (FIG. 1)), heating/cooling system (e.g., heating/cooling system 104 (FIG. 1)), and exterior thermometer (e.g., for use in detecting the exterior conditions). Line 860 indicates that suitable interior features for generating the environmental condition of "Action Scene" may be automatic seat adjustment (e.g., on seat 110 (FIG. 1)). The movement of the seat back and forth may simulate the abrupt movements of a typical action sequence.

Data structure 850 may be stored on, or retrieved from, media asset source 418 (FIG. 4), application source 422 (FIG. 4), user equipment 402, 404, and/or 406 (FIG. 4), and/or any location or device accessible via communications network 414 (FIG. 4).

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for producing environmental conditions associated with media assets, comprising:
   receiving media information associated with a media asset;
   determining an environmental condition of a current progress point in the media asset based on the media information;
   accessing a database of control systems, wherein each entry in the database of control systems includes a first field corresponding to a given environmental condition, a second field corresponding to a given control system that can be used to the produce the given environmental condition, and a third field corresponding to a given setting for the given control system that is required to produce the given environmental condition, to determine a control system and a setting for the control system that can be used to produce the environmental condition of the current progress point; and
   generating the environmental condition by adjusting a current setting for the control system to the setting.

2. The method of claim 1 further comprising generating the database of control systems used to produce environmental conditions based on user registration information.

3. The method of claim 1 further comprising identifying all available control systems used to produce environmental conditions to generate the database of control systems used to produce environmental conditions.

4. The method of claim 1 further comprising determining a position of an occupant accessing the media asset.

5. The method of claim 4 further comprising generating the environmental condition of the current progress point in the media asset only at the determined position.

6. The method of claim 1, wherein the environmental condition is any one of sunshine, wind, heat, cold, rain, abrupt movements, and rhythmic audio sequences, and wherein the control system is any one of a control system for an automatic window, an automatic seat heater, an automatic sunroof, an automatic seat, and a heating/cooling system.

7. The method of claim 1, wherein generating the environmental condition of the current progress point in the media asset by adjusting the current setting for the control system to the setting further comprises:
   determining that the environmental condition of the current progress point in the media asset comprises sunshine;
   determining exterior environmental conditions comprise sunshine; and
   upon determining the exterior environmental conditions comprise sunshine, determining the setting to be a setting to open a window.

8. The method of claim 1, wherein the environmental condition of the current progress point in the media asset is determined by processing an environmental condition indicator.

9. The method of claim 8, wherein the environmental condition indicator is received in the media information associated with the media asset.

10. The method of claim 8, wherein the environmental condition indicator is generated by processing images of the media asset as displayed on a display in the vehicle using image recognition technology.

11. A system for producing environmental conditions associated with media assets, the system comprising:
   storage circuitry configured to store a database of features used to produce environmental conditions; and
   control circuitry configured to:
      receive media information associated with a media asset;
      determine an environmental condition of a current progress point in the media asset based on the media information;
      access a database of control systems, wherein each entry in the database of control systems includes a first field corresponding to a given environmental condition, a second field corresponding to a given control system that can be used to the produce the given environmental condition, and a third field corresponding to a given setting for the given control system that is required to produce the given environmental condition, to determine a control system and a setting for the control system that can be used to produce the environmental condition of the current progress point; and
      generate the environmental condition by adjusting a current setting for the control system to the setting.

12. The system of claim 11, wherein the control circuitry is further configured to generate the database of control systems used to produce environmental conditions based on user registration information.

13. The system of claim 11, wherein the control circuitry is further configured to identify all available control systems used to produce environmental conditions to generate the database of control systems used to produce environmental conditions.

14. The system of claim 11, wherein the control circuitry is further configured to determine a position of an occupant accessing the media asset.

15. The system of claim 14, wherein the control circuitry is further configured to generate the environmental condition of the current progress point in the media asset only at the determined position.

16. The system of claim 11, wherein the environmental condition is any one of sunshine, wind, heat, cold, rain, abrupt movements, and rhythmic audio sequences, and wherein the control system is any one of a control system for an automatic window, an automatic seat heater, an automatic sunroof, an automatic seat, and a heating/cooling system.

17. The system of claim 11, wherein the control circuitry configured to generate the environmental condition of the current progress point in the media asset by adjusting the current setting for the control system to the setting is further configured to:
   determine that the environmental condition of the current progress point in the media asset comprises sunshine;
   determine exterior environmental conditions comprise sunshine; and
   upon determining the exterior environmental conditions comprise sunshine, determine the setting to be a setting to open a window.

18. The system of claim 11, wherein the environmental condition of the current progress point in the media asset is determined by processing an environmental condition indicator.

19. The system of claim 18, wherein the environmental condition indicator is received in the media information associated with the media asset.

20. The system of claim 18, wherein the environmental condition indicator is generated by processing images of the media asset as displayed on a display in the vehicle using image recognition technology.

* * * * *